US009703349B2

(12) United States Patent
Gelonese

(10) Patent No.: US 9,703,349 B2
(45) Date of Patent: Jul. 11, 2017

(54) PC POWER MONITORING

(71) Applicant: Embertec Pty Ltd, Dulwich, South Australia (AU)

(72) Inventor: Giuseppe Antonio Gelonese, Dulwich (AU)

(73) Assignee: Embertec Pty Ltd (AU)

( * ) Notice: Subject to any disclaimer, the term of this patent is extended or adjusted under 35 U.S.C. 154(b) by 626 days.

(21) Appl. No.: 14/350,917

(22) PCT Filed: Oct. 18, 2012

(86) PCT No.: PCT/AU2012/001269
§ 371 (c)(1),
(2) Date: Apr. 10, 2014

(87) PCT Pub. No.: WO2013/056310
PCT Pub. Date: Apr. 25, 2013

(65) Prior Publication Data
US 2014/0285019 A1    Sep. 25, 2014

(30) Foreign Application Priority Data
Oct. 18, 2011 (AU) .............................. 2011904296

(51) Int. Cl.
*G06F 1/32* (2006.01)
*H01R 13/70* (2006.01)
(Continued)

(52) U.S. Cl.
CPC ............... *G06F 1/32* (2013.01); *G06F 1/325* (2013.01); *G06F 1/3206* (2013.01);
(Continued)

(58) Field of Classification Search
CPC ... G06F 1/26; G06F 1/266; G06F 1/32; G06F 1/3203; G06F 1/3206; G06F 1/3215;
(Continued)

(56) References Cited

U.S. PATENT DOCUMENTS 4,901,007 A     2/1990  Sworm
5,359,540 A *  10/1994  Ortiz ...................... G06F 1/266
                                                              307/115

(Continued)

FOREIGN PATENT DOCUMENTS

AU      2011 101402 A4   12/2011
AU      2012 100197 A4    3/2012
(Continued)

*Primary Examiner* — Levi Gannon
(74) *Attorney, Agent, or Firm* — Craig A. Fieschko, Esq.; DeWitt Ross & Stevens S.C.

(57) ABSTRACT

An energy saving device that has an electrical inlet which connects to a general power outlet, and has at least one monitored electrical outlet connecting to a computing device, the energy saving device having at least one switched electrical outlet which connects to, and supplies electrical power to, at least one peripheral device, which in a preferred embodiment is a computer monitor. The energy saving device includes a switch to control electrical connection of the inlet to the switched electrical outlet, and thus to control supply of electric power to the peripheral devices. Other peripherals may include printers, speakers and desk lamps.

20 Claims, 6 Drawing Sheets

(51) Int. Cl.
  *H02J 9/00* (2006.01)
  *H01R 13/66* (2006.01)
  *H01R 25/00* (2006.01)

(52) U.S. Cl.
  CPC .......... *G06F 1/3215* (2013.01); *G06F 1/3231* (2013.01); *G06F 1/3246* (2013.01); *H01R 13/6683* (2013.01); *H01R 13/70* (2013.01); *G06F 2200/261* (2013.01); *H01R 25/003* (2013.01); *H02J 2009/007* (2013.01); *Y02B 60/1296* (2013.01); *Y10T 307/469* (2015.04)

(58) Field of Classification Search
  CPC ...... G06F 1/3231; G06F 1/3246; G06F 1/325; G06F 2200/261; H01R 13/6683; H01R 13/70; H01R 25/003; H02J 9/005; H02J 2009/007; Y02B 60/1282; Y02B 60/1296; Y10T 307/469
  USPC ............................ 307/39; 713/320, 323, 324
  See application file for complete search history.

(56) References Cited

U.S. PATENT DOCUMENTS

| | | | |
|---|---|---|---|
| 5,481,732 A * | 1/1996 | Shahbazi | G06F 1/3218 345/212 |
| 5,506,790 A * | 4/1996 | Nguyen | G06F 1/3215 307/115 |
| 5,594,672 A * | 1/1997 | Hicks | G06F 1/32 307/125 |
| 5,721,934 A | 2/1998 | Scheurich | |
| 6,092,209 A | 7/2000 | Holzhammer et al. | |
| 6,317,839 B1 * | 11/2001 | Wells | G06F 1/3221 713/320 |
| 6,476,729 B1 | 11/2002 | Liu | |
| 6,744,150 B2 * | 6/2004 | Rendic | G06F 1/266 307/115 |
| 7,380,142 B2 | 5/2008 | Lee et al. | |
| 7,622,822 B2 * | 11/2009 | Gelonese | G06F 1/266 307/38 |
| 8,190,940 B2 | 5/2012 | Gelonese | |
| 8,362,918 B2 | 1/2013 | Choi et al. | |
| 8,386,369 B2 | 2/2013 | Warnick | |
| D700,557 S | 3/2014 | Mobbs | |
| 2002/0111076 A1 * | 8/2002 | Wendt | G06F 1/266 439/652 |
| 2005/0030680 A1 | 2/2005 | Lee et al. | |
| 2005/0289378 A1 | 12/2005 | Vorenkamp et al. | |
| 2006/0101294 A1 | 5/2006 | Lee et al. | |
| 2009/0091192 A1 * | 4/2009 | Robertson | G06F 1/266 307/125 |
| 2009/0125743 A1 * | 5/2009 | Robertson | G06F 1/266 713/324 |
| 2010/0095146 A1 * | 4/2010 | Gelonese | G06F 1/3206 713/324 |
| 2010/0156666 A1 | 6/2010 | Choi et al. | |
| 2011/0106687 A1 | 5/2011 | Warnick | |
| 2011/0157812 A1 * | 6/2011 | Moon | G06F 1/3203 361/679.33 |
| 2011/0254371 A1 | 10/2011 | Galsim et al. | |
| 2011/0304208 A1 * | 12/2011 | Lee | G06F 1/266 307/39 |
| 2012/0080949 A1 | 4/2012 | Gelonese | |
| 2012/0312989 A1 | 12/2012 | Gelonese | |

FOREIGN PATENT DOCUMENTS

| | | |
|---|---|---|
| AU | 2012 101351 A4 | 9/2012 |
| CA | 2585966 A1 | 5/2006 |
| CA | 2743270 A1 | 5/2010 |
| CA | 2719683 A1 | 5/2011 |
| CN | 1773399 A | 5/2006 |
| CN | 102292895 A | 12/2011 |
| CN | 102356363 A | 2/2012 |
| EP | 1612910 A1 | 1/2006 |
| EP | 2356525 A2 | 8/2011 |
| JP | 2003 271812 A | 9/2003 |
| JP | 2006 139745 | 6/2006 |
| JP | 2011 010436 A | 1/2011 |
| KR | 20100075283 A | 7/2010 |
| NO | 20072468 A | 5/2007 |
| TW | 201031072 A | 8/2010 |
| WO | WO 03062973 A1 | 7/2003 |
| WO | WO 2006 052047 | 5/2006 |
| WO | WO 2008 077198 A1 | 7/2008 |
| WO | WO 2010 057343 A2 | 5/2010 |
| WO | WO 2010 074392 A1 | 7/2010 |
| WO | WO 2010 139020 A1 | 12/2010 |
| WO | WO 2013 006916 A1 | 1/2013 |
| WO | WO 2013 056310 A1 | 4/2013 |
| WO | WO 2013 956310 A1 | 4/2013 |
| WO | WO 2013 131147 A1 | 9/2013 |

* cited by examiner

PC POWER MONITORING

FIELD OF THE INVENTION

The present invention relates to an apparatus and method to regulate the supply of power to and to control the power modes of a device, in particular of a computer.

BACKGROUND

Computer devices, in particular personal computer devices, enter a low power or standby mode when a user has not operated the computer for a defined period of time. This is sometimes referred to as a standby or low power mode.

The low power or standby mode is often referred to as the "sleep" or "hibernate" mode, where the computer cuts or attempts to reduce the provision of power to superfluous areas of the computing device and allow a user to resume working or operating a machine from the standby mode without having to go through an extended reboot process.

Entering a low power mode on a computer device will provide power savings. However, users may find such entry to be inconvenient, especially when it is unexpected. Since the delay period for entering standby is typically set by the user this often results in users setting extended time frames for the low power mode to be entered resulting in a significant delay before the onset of the power saving functionality.

Typically, a computer device will determine when to enter a low power mode based on a time period for which user input, usually in the form of keyboard or mouse use, is absent. Since a computer may be in use without such user input, this may lead to unexpected and unwanted activation of the low power mode. Such an occurrence is likely to prompt a user to disable the low power mode or at least to extend the time period before it is entered.

In a business environment, it is not uncommon for users to disable the standby power mode, preferring the convenience of having the computer always on and ready to use without the need to provide user input (keyboard or mouse use) to stop the computer entering into the standby mode when the user does not wish this to happen. The issue of unwanted entry into the standby mode is magnified when a user is working on the computer but not providing user input, such as when watching or giving a presentation such as a slide show or when involved in video conferencing.

SUMMARY OF THE INVENTION

In one form of the invention, it may be said to lie in an energy saving device including an electrical inlet which connects to a general power outlet, with at least one monitored electrical outlet connecting to a computing device, the energy saving device having at least one switched electrical outlet which connects to, and supplies electrical power to, at least one peripheral device, which in a preferred embodiment is a computer monitor. Other peripherals may include printers, speakers and desk lamps.

The energy saving device includes a switch to control electrical connection of the inlet to the switched electrical outlet, and thus to control supply of electric power to the at least one peripheral device. There is a sensor adapted to sense at least one characteristic of an electrical power flow through the monitored electrical outlet to the computing device, and means to communicate a signal to the computing device when the sensed characteristic indicates that the computing device is not in active use. The signal is used to request the computing device to enter a low power standby mode.

In preference, when the sensor detects that the computing device has entered a low power standby mode the device will remove power from the switched electrical outlet, and thus from the connected peripheral devices, which do not need to be powered when the computing device is not in use.

In preference, the sensed characteristic is a characteristic of one or more of true RMS power, voltage, and current of the electrical power flow.

In a further form, the invention lies in a method for reducing energy used in a computer installation by providing an energy saving device having an electrical inlet adapted to connect to a general power outlet, the energy saving device having at least one monitored electrical outlet adapted to connect to a computing device, and at least one switched electrical outlet adapted to connect to, and to supply electrical power to, at least one peripheral device. The method includes determining that the computing device is in not in active use, then querying a user to indicate that the computing device is required to be active, and in the absence of such indication then placing the computing device into a low power standby mode.

In preference, the method further includes determining that the computing device has entered a power standby mode; then removing electrical power from the peripheral device.

In preference, the querying step includes receiving a communication indicating that the computing device is not in active use and displaying a warning that the computing device will shut down imminently on a monitor screen of the computing device, monitoring the computing device for user interaction and accepting such interaction to indicate that the computing device is required to be active.

In preference, determining that the computer is not in active use is performed by sensing at least one characteristic of an electrical power flow through the monitored electrical outlet to the computing device.

In a yet further form, the invention lies in a method for saving energy in a personal computer installation including receiving from a monitoring device an indication that a computer is not in active use, querying a user to indicate that the computing device is required to be active, and in the absence of such indication, placing the computing device into a low power standby mode.

In a yet further form, the invention lies in a system for reducing energy used in a personal computer installation including an energy saving device including an electrical inlet adapted to connect to a general power outlet, at least one monitored electrical outlet adapted to connect to a computing device, at least one switched electrical outlet adapted to connect to, and to supply electrical power to, at least one peripheral device, switch means adapted to control electrical connection of the inlet to the switched electrical outlet, and thus to control supply of electric power to the at least one peripheral device, sensor means adapted to sense at least one characteristic of an electrical power flow through the monitored electrical outlet to the computing device, communication means adapted to communicate a signal to the computing device when said sensed characteristic indicates that the computing device is not in active use, the signal requesting the computing device to enter a low power standby mode; a personal computer in the personal computer installation when programmed to receive from a monitoring device an indication that a computer is not in active use;

query a user to indicate that the computing device is required to be active, and in the absence of such indication; then place the computing device into a low power standby mode.

In the prior art, there are devices and software programs which monitor user interaction with a PC in the form of keystrokes and mouse movements. When no such interaction is detected for a specified period, the assumption is made that the PC is not in use and the PC is forced into a low power standby mode, or power to the PC is removed. These have the disadvantage that some uses of a PC, for example watching video material, or performing long calculations, may not require any user interaction. When such use is taking place, these prior art devices will incorrectly assume that the PC is unused, and will "turn off" the PC.

In a further form of the invention, an energy saving device is adapted to detect a power draw condition of the computing device which allows the energy saving device to categorize the use mode of the computing device as Active Standby, that is fully powered, but not performing any user function. When the computing device is performing activities such as video display, or extended calculations, the power draw characteristics will be such that the energy saving device will not categorize the use mode of the computer as Active Standby. When the use mode Active Standby is identified by the energy saving device, the energy saving device communicates to the computing device. In the event that no user interaction with the computing device has been detected for a threshold period, the computing device provides an indication, visible to a user, if present, that the computing device is about to be shut down. Where a user is present, and wishes to continue using the computing device, the user may interact with the computing device, which will cancel the impending shutdown. If no such interaction occurs, the computing device is placed in a Low Power Standby mode. This mode change is detected by the energy saving device, due to the change in the power draw characteristics. The energy saving device responds to this by removing power from peripheral devices which are not needed when the computing device is not in active use.

DETAILED DESCRIPTION OF THE INVENTION

Figure 1:
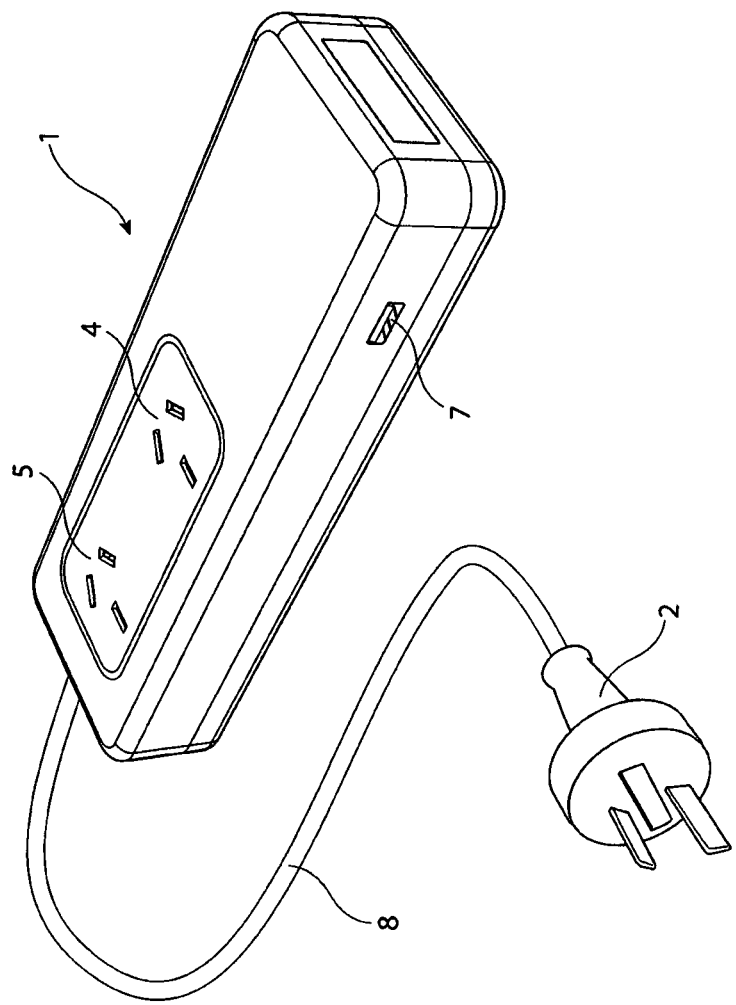
FIG. 1 is an illustration of an energy saving device.

Referring now to FIG. 1, there is shown an energy saving device 1, which has a plug 2 which is adapted to be connected to a general purpose electrical outlet (GPO). The energy saving device 1 provides at least two electrical outlets 4,5 adapted to supply electrical power to electrical appliances. As illustrated there is a monitored electrical outlet 4 and a switched electrical outlet 5. In other embodiments multiples of either or both of these two types of outlet may be provided. Further outlets, which may be designated always on and which supply power at all times when power is provided to the energy saving device via plug 2 may also be provided.

Each electrical outlet of the energy saving device may be provided with identical electrical circuitry, with the function of the outlet being determined by software. Alternatively, each electrical outlet may include electrical circuitry specific to the function of that outlet.

Figure 2:
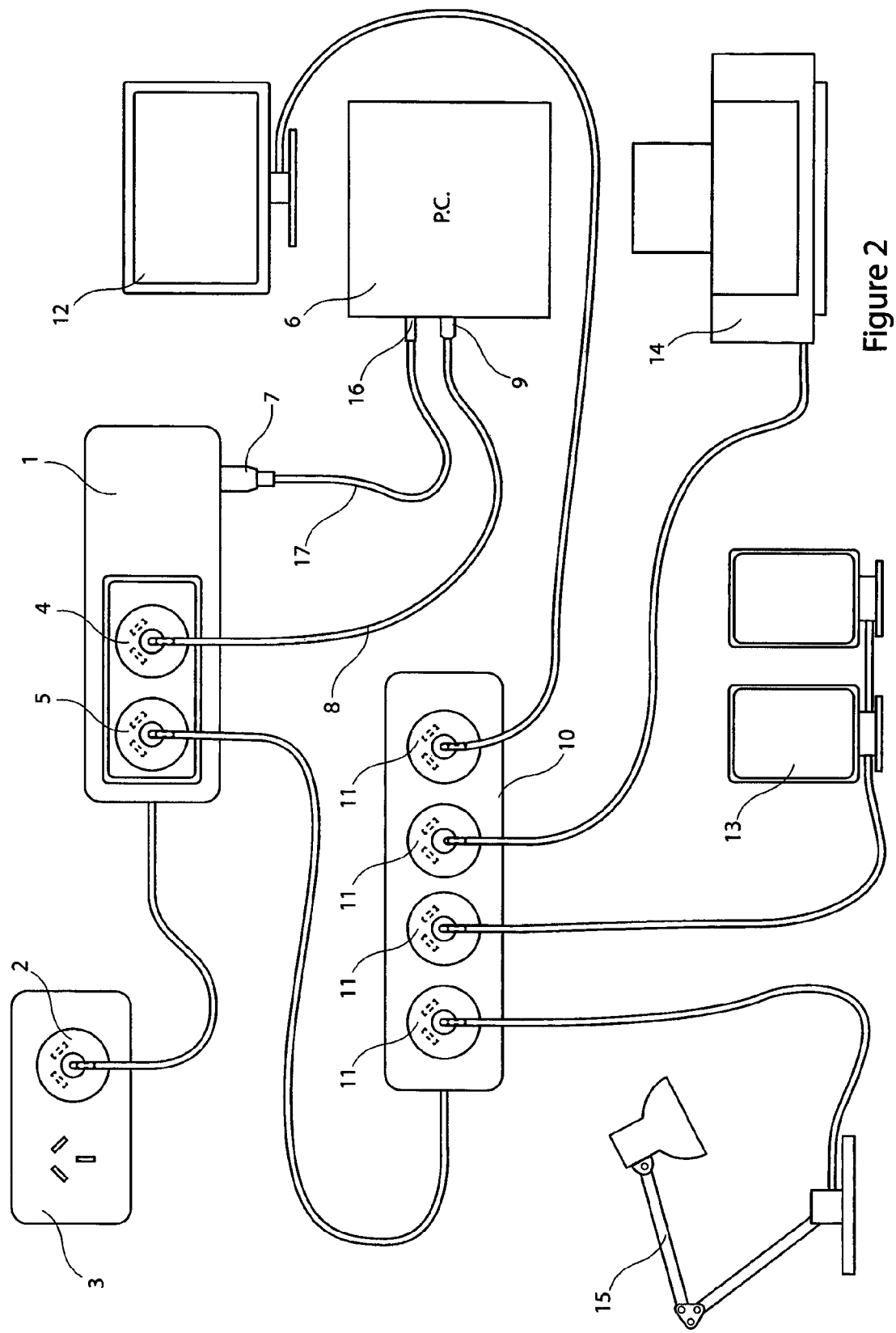
FIG. 2 is a representation of a home computer installation including the energy saving device of FIG. 1.

Referring now to FIG. 2, the energy saving device 1 of FIG. 1, is shown connected to GPO 3 which supplies electrical power to the energy saving device 1. The energy saving device includes monitored electrical outlet 4 into which is plugged cord 8 which carries electrical power from monitored outlet 4 to a personal computer (PC) 6. Any suitable computing device may be used, and is encompassed by the term PC as used herein, including without limitation, Apple Macintosh computers; computers running Unix based operating systems; and laptop, notebook and tablet computers.

There is a switched electrical outlet 5 which provides electrical power to a power board 10. The power board includes multiple power outlets 11. These outlets provide power to devices used in the computing environment which require power only when the PC itself is in use. This includes, without limitation, computer peripheral equipment such as a computer monitor 12, speakers connected to the PC 13, and a printer 14. It may also include equipment which is not part of the computer installation, but is nonetheless only required when the computer itself is in use, such as a desk lamp 15. The term "computer peripherals", as used herein is to be taken to include all of the foregoing.

Alternatively, a single peripheral, preferably a computer monitor, may be powered directly from the switched outlet 5. In embodiments with multiple switched outlets, multiple peripherals may be powered from switched outlets, with or without a power board.

The energy saving device also includes a communications port, in the illustrated embodiment, a USB port 7. The USB port is connected via cable 8 to a USB port 16 of the PC 6. This enables data communication via the USB protocol between the energy saving device and the PC. Other types of communication port/communication protocol, may be used, including, without limitation wireless communication ports and protocols. In other embodiments, communication between the energy saving device and the PC may not be direct, but may occur via a third device such as a communications server, or a public or private communications network, or any other suitable device or network.

Figure 3:
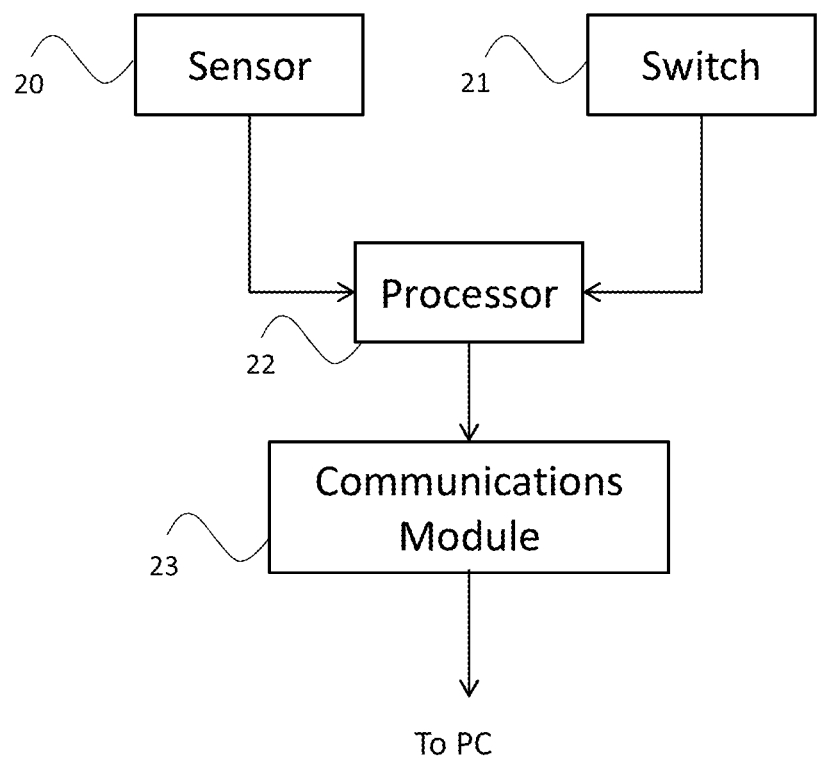
FIG. 3 is a block diagram of the energy saving device of FIG. 1.

Referring to FIG. 3, which is a partial block diagram of the circuit of the energy saving device, there is provided a sensor 20 which monitors the power drawn through the monitored electrical outlet 4. The sensor may measure one or all of true RMS power, current, voltage and phase angle or power factor drawn by or across the load connected to the one or more monitored outlets 4.

There is also provided a switch 21, which operates to control the connection of electrical power from the GPO via plug 2 to the switched outlet or outlets 5.

There is a communication module 23 which provides data communication between the energy saving device and the PC. In the illustrated embodiment, this is a USB communications module, but any other suitable communication connection and protocol may be employed.

There is a processor 22. The processor receives the output of the sensor 20 and controls the switch 21. The processor also receives data from, and sends data to, the PC 6 via the communications module.

In alternative embodiments, the communications module may be incorporated into the processor. Alternatively, the processor may be absent and the communications module may provide for direct communication with the PC by the sensor 20 and the switch 21. In these embodiments, all functions of the processor described herein are undertaken by software running on the PC or another remote processor.

In other embodiments, the sensor, processor and communications module functions may be provided by a single unit.

In use the sensor output is monitored by the processor to determine a functional state of the PC. The functional state may be determined from the characteristics and/or magnitude of the power drawn by the PC, as detected by the sensor. In a preferred embodiment, fluctuations in the power supplied to the PC through the energy saving device are monitored. Any or all of relative magnitude, absolute magnitude and frequency of the fluctuations may be monitored.

A greater level of power fluctuations indicates that the PC is in active use. Lower levels of power fluctuations, or the absence of power fluctuations, indicate that the PC is not in active use, although it may still be operating at full power.

In other embodiments, the functional state of the PC may be determined by comparing the power drawn by the PC through the energy saving device to one or more predetermined thresholds. These thresholds may include a time component, that is meeting the threshold may require the power to be within a particular value range for a particular time. When to power drawn is below a certain threshold, the functional state of the PC is determined to be the corresponding state.

In a preferred embodiment, the processor distinguishes at least three functional states of the PC. These are Active Use, Full Power Standby, and Low Power Standby. Active Use is detected when the PC is in use, fully powered, and with a user interacting with or otherwise actively using the PC. Preferably, use which may not involve direct physical interaction with the PC, such as watching video material, or performing extended calculations, will be categorized as Active Use. Full Power Standby occurs when the PC is fully powered, but is not being actively used by a user, that is, there is no user interacting with the PC. Low Power Standby occurs when the PC has entered a low power state, which may be "sleep" or "hibernate". These low power states may be separately identified by the processor. This state detection may also include the condition when the PC is off.

The determination of the functional state may include a duration component. The determination of a change in the determined functional state may not coincide in time with any specific change in the power usage of the PC.

In the preferred embodiment, the PC will be determined to be in Active Use functional state when a sufficiently high level of power fluctuations is detected, over a sufficiently short period of time. Relative and absolute power measurements may also be used. Full Power Standby will be determined to be the functional state of the PC when there is a lower level of power fluctuation detected by the sensor for a sufficiently long period of time. A particular range of values of absolute or relative average power use by the PC may also be required in order for the functional state of the PC to be categorized as Full Power Standby by the energy saving device. The categorization of the functional state of the computing device as Full Power Standby indicates that the PC is not being actively used by a user, but has not entered a low power standby mode.

The processor will cause the switch to operate to remove power from the switched electrical outlet 5 when Low Power Standby functional state is detected, thus removing power from the computer peripherals. This ensures that the computer peripherals are not drawing power unnecessarily during at least some of the time when the PC is not in use.

The PC runs Hibernation Module software which communicates with the energy saving device. This software may run as a stand-alone program, as a service, as part of the computer operating system, or in any other convenient manner. In other embodiments the Hibernation module may also be implemented as firmware or hardware built in to or connected to the PC.

When the processor determines the functional state of the PC to be Full Power Standby, the processor communicates this to the Hibernation Module via the Communication Module. In the simplest embodiment, this communication will be the single command "Hibernate", instructing the Hibernate Module to cause the PC to enter a low power standby mode, such as sleep or hibernate, if possible.

In some embodiments, the Full Power Standby and Low Power Standby states may not be distinguished. At any time when the functional state Active Use is not detected, the processor may communicate this to the Hibernation Module.

Figure 4:
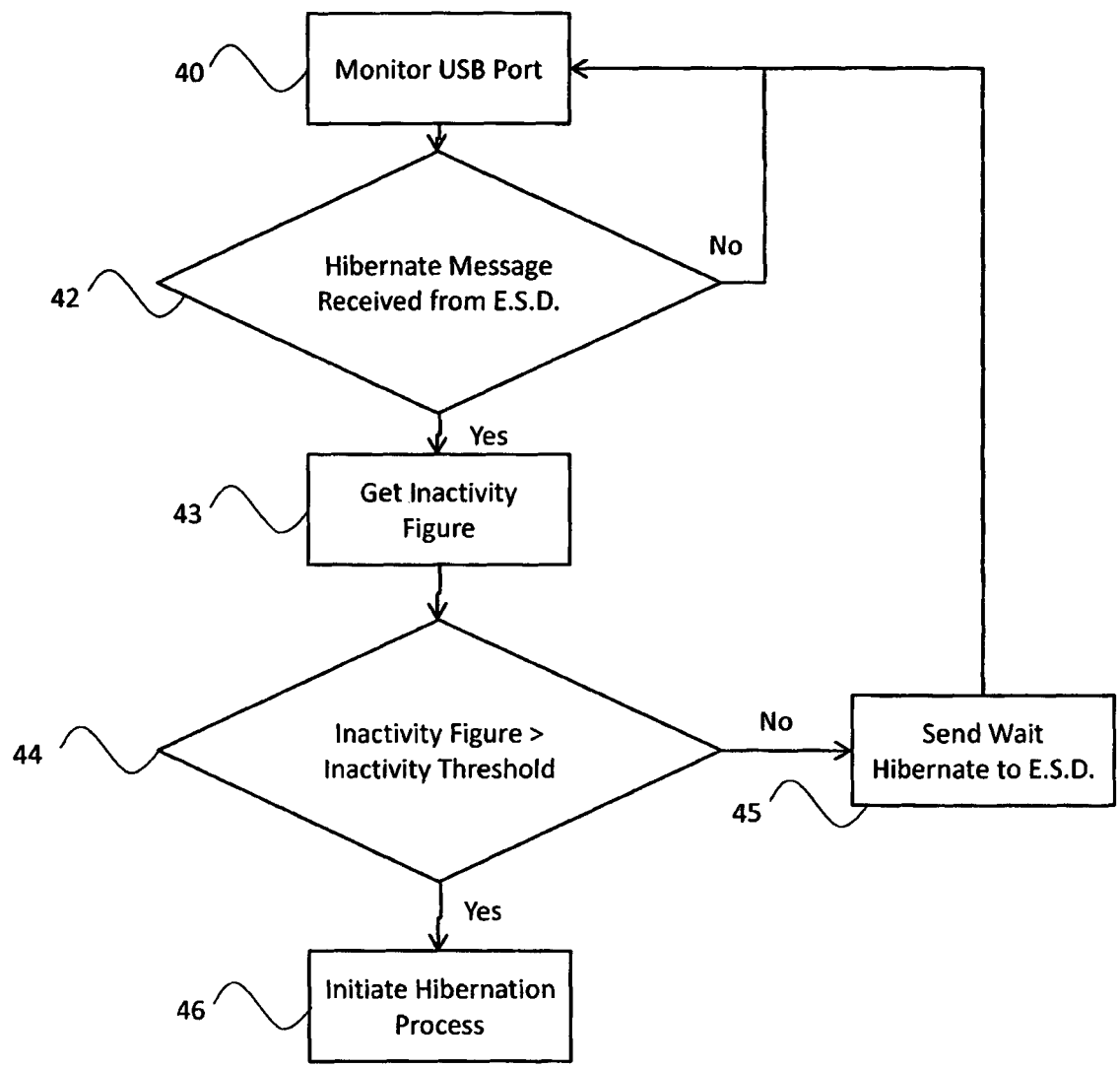
FIG. 4 is a flow chart describing the function of the energy saving device of FIG. 1.

FIG. 4 shows a flow chart of the functionality of the Hibernation Module. The Hibernation Module performs the action Monitor USB Port 40 wherein the USB port 16 of the PC is monitored for incoming data communicated from the energy saving device processor 22 via Communications Module 23.

Commands received from the energy saving device are checked 42, in order to detect a Hibernate command from the energy saving device. Where the command is not a Hibernate command, monitoring 40 continues. Where the command is a Hibernate command, the action Get Inactivity FIG. 43 is performed.

The action Get Inactivity Figure returns a value User Inactivity indicating the degree to which the PC is not engaged in interactive activity with a user. In a preferred embodiment, this is the length of time since the PC has recorded a keystroke or a mouse movement. In the Microsoft Windows operating system, this value is available as the result of an API call, built in to the operating system. Similar results are available when other operating systems are employed. In other embodiments, other means of detecting user interaction may be employed. This may include, without limitation, detection of movement using a camera attached to or integral with the PC; detection of touch on a touchscreen or touchpad; detection of use of a game pad, joystick or other user input device; presence detection using passive or active infra-red sensors; and other suitable forms of presence detection. In these cases, User Inactivity is a value indicating the length of time since a user interaction with the PC has been detected.

The User Inactivity value is then checked 44 against an Inactivity Threshold. In a preferred embodiment, the Inactivity Threshold is a pre-set value which is the length of time that the PC is to be allowed to remain in Active Standby before being placed into Low Power Standby. The threshold value may be set by default, or the Hibernate Module may include a user interface which allows the Inactivity Threshold value to be set by a user. In further embodiments, the value of Inactivity Threshold may be communicated to Hibernate Module by the energy saving device.

Where check 44 indicates that User Inactivity is greater than Inactivity Threshold, Hibernate Module initiates 46 the process Hibernation Process. Where User Inactivity is less than Inactivity Threshold, a Wait command is communicated 45, via the Communication Module, to the energy saving device. This communication includes a value Wait Hibernate which is the time period which must elapse before the energy saving device will again send a Hibernate command to the Hibernation Module. The value of Wait Hibernate is slightly more than Inactivity Threshold less User Inactivity. The energy saving device processor receives the value Wait Hibernate. No further Hibernate command will be sent from the energy saving device to the Hibernate Module until the Wait Hibernate time period has expired. This prevents the energy saving device from repeatedly sending Hibernate commands which will be ignored because the PC has not been in an Active Standby functional state for a sufficient period.

Following the sending of the Wait command, the Hibernate Module continues from the Monitor USB Port function 40.

In other embodiments, the Wait Hibernate value is not calculated nor sent to the energy saving device. The Hibernate Module simply returns to the Monitor USB Port function to await the next Hibernate command. In this embodiment, the energy saving device will preferably include a fixed delay between sending of Hibernate commands to avoid overloading the Hibernate Module with redundant Hibernate commands.

The Hibernation Process is the process whereby the PC is placed into a Low Power Standby mode. It is entered when both of the following criteria are met:
  a) The energy saving device has determined that the PC is in a state where it is fully powered, but is not in active use by a user; and
  b) The Hibernation Module has determined that there has been no user interaction with the PC for a period of time sufficient to indicate that the PC is not in active use.

The Hibernation Process provides a warning to a user that the PC is about to be placed in a Low Power Standby mode. The user is given an opportunity to indicate that the PC is in use and should not enter Low Power Standby. If no such indication is made, then the PC is placed in Low Power Standby mode. In a preferred embodiment, the warning is by way of a splash screen notification displayed on the monitor of the PC. In other embodiments, other visual or audible warnings may be used. These warnings include, without limitation, flashing lights, spoken word notifications and warning tones. The indication that the PC should not be placed into Low Power Standby mode may be by an explicit choice, such as selecting a specific item from a displayed menu, or, it may be assumed from any interaction with the PC, such as a keystroke or mouse movement.

Figure 5:
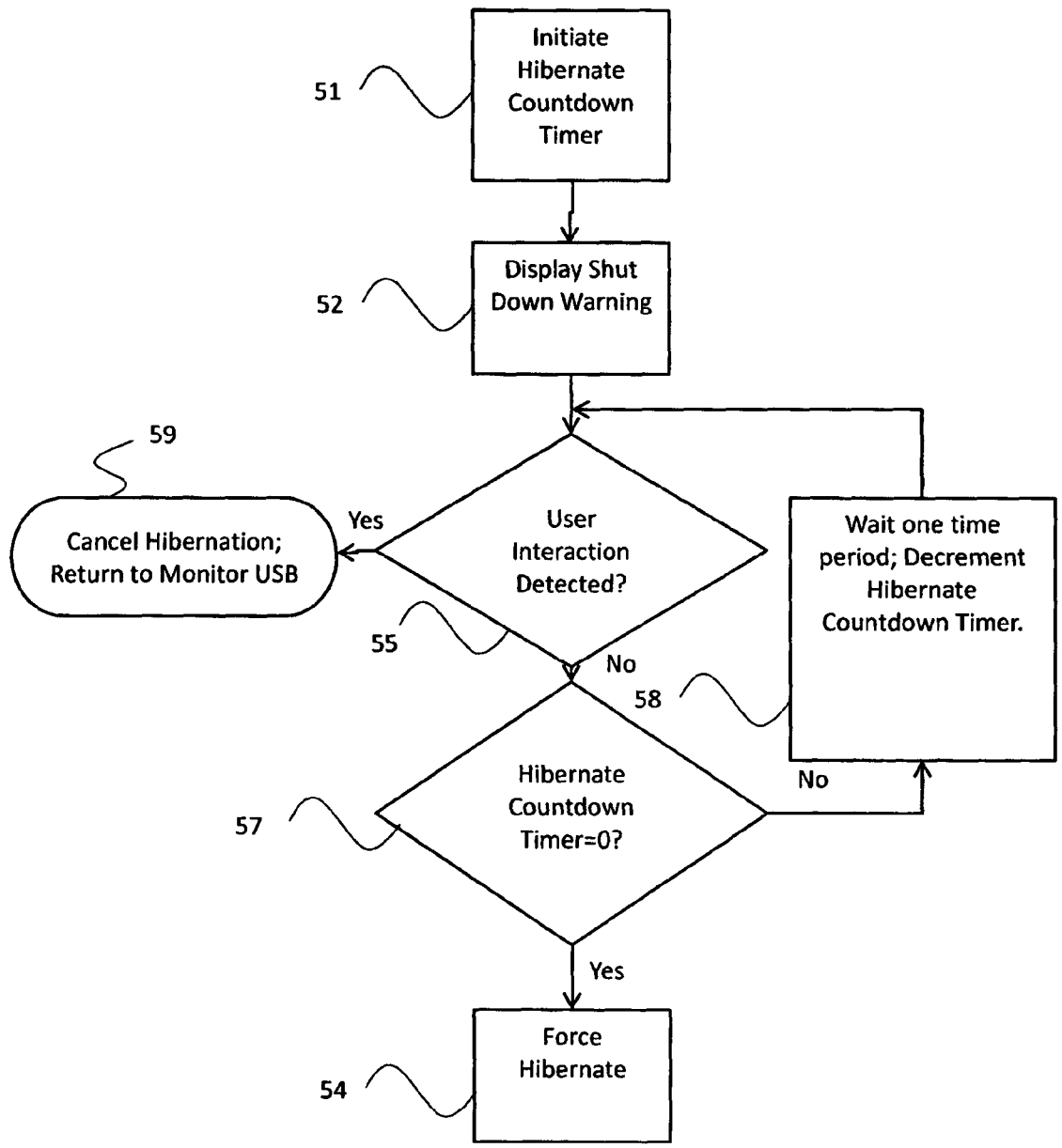
FIG. 5 is a flow chart describing s Hibernate Process.

The Hibernation Process is illustrated in the flowchart of FIG. 5. When the process is entered 51, a Hibernate Countdown Timer is set to a starting value. This starting value may be set by default or may be able to be pre-set by a user. In a preferred embodiment, the value is set to ten minutes. This is the length of time during which the user is able to indicate that they are interacting with the PC and that they do not wish the PC to be placed into Low Power Standby mode. If no user is present, no such indication will be made, and the PC will be put into a Low Power Standby mode.

Figure 6:
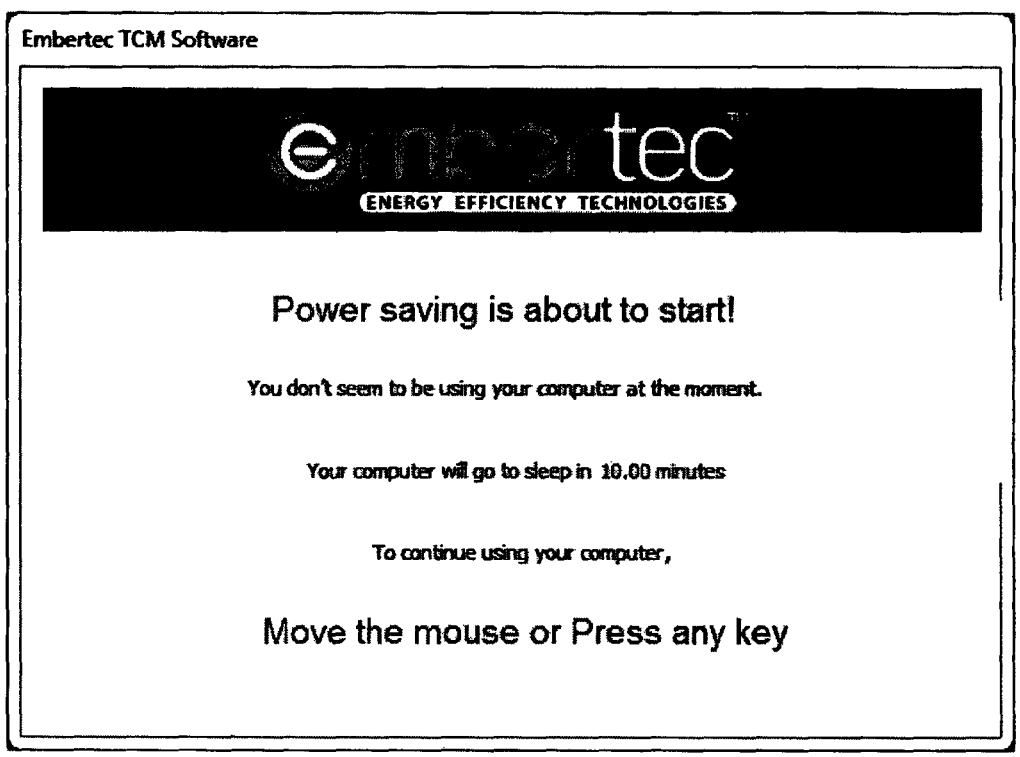
FIG. 6 is a warning splash screen displayed by an embodiment of the invention.

A warning of impending shut down is then displayed 52 as a splash screen on a PC monitor. An example warning is shown in FIG. 6. The text of the warning indicates that the PC will shortly be placed into a nominated Low Power Standby mode, which may be "sleep" or "hibernate" or any other suitable low power use-mode of operation. The text invites a user to interact with the PC, by keystroke or mouse movement, in order to prevent the change in mode. The time left before shut down, being the value of the Hibernate Countdown Timer, may also be displayed.

The process then continues with a check 55 for any user interaction in response to the warning. If user interaction is detected, the Hibernate Process is then cancelled 59 and the Hibernate Module continues with the action Monitor USB Port 40. No shut down takes place.

A check 57 is then made to see if the Hibernation Countdown Timer has reached zero.

If no user interaction is detected, the Hibernate Countdown Timer is decremented according to the elapsed time. A further check 55 is then made. This continues until either user interaction is detected by check 55, or the value of the Hibernate Countdown Timer is found to be zero at check 57. When the Hibernate Countdown Timer reaches zero, the action Force Hibernate 54 is undertaken. In this action, the operating system of the PC is instructed to place the PC into a Low Power Standby mode which may be "sleep" or "hibernate". In a preferred embodiment, the Hibernate Process is coded to select "sleep" as the Low Power Standby mode. In other embodiments, the Hibernate Module may include a user interface which allows a user to pre-set which mode should be chosen.

In other embodiments, the display of the user warning may include an option to cause hibernation immediately, without waiting for the Hibernate Countdown Timer to count down. There may also be an explicit option which must be selected to prevent shut down, beyond merely moving a mouse or providing a key stroke.

In other embodiments, other measures indicating that the PC is in use, even if there is no user interaction, may be used in setting the value of User Inactivity. This may include, without limitation, the PC processor load, the throughput of any I/O (input/output) ports and whether the display of the computing device is active. These other measures may be used to directly set or to modify User Inactivity such that it is more or less likely to exceed the threshold and cause the PC to be instructed to enter a low power standby mode. For example, a high level of processor load, indicating active use, may cause the User Inactivity value to be decreased, meaning that a longer period without a user physically interacting with the PC would be required before the process Hibernate Process is initiated.

It is a function of the energy saving device that the processor will cause the switch to operate to remove power from the switched electrical outlet 5 when. Low Power Standby functional state is detected, thus removing power from the computer peripherals.

When the PC is forced into Low Power Standby by the Hibernate Module, the power draw characteristics sensed by the sensor are analysed by the processor to identify that the PC is in Low Power Standby mode. The processor then controls the switch to remove power from the switched electrical outlet, thus removing power from the computer peripherals which are not needed when the PC is not in use.

Movement of the mouse, activation of the keyboard, or pressing the power on button on the PC will bring the PC out of Low Power Standby mode in the usual manner. The energy saving device will detect this change in functional state. The processor will then operate the switch to return power to the switched electrical outlet returning power to the computer peripherals.

The terms keystroke and mouse movement as used herein include analogous actions performed using other hardware, including without limitation, virtual keyboards, touchscreens, touchpads, trackballs and thumbwheels.

In other embodiments, the Hibernation Module may directly instruct the processor or the switch to remove power from the switched electrical outlet, before the PC is placed into a Low Power Standby mode.

In a further embodiment, the energy saving switch may include a Peripheral Power-Down Countdown Timer. This Timer is set when the processor signals the Hibernate command to the PC. The set value is a default value, which in a preferred embodiment is thirty minutes. This Timer begins to count down, in accordance with the elapsed time since the Hibernate command has been sent. When any communication is received from the PC, the count down of the Peripheral Power-Down Countdown Timer is cancelled. Where no communication is received from the PC, the Timer will reach zero. When the Timer reaches zero, the processor operates the switch to remove power from the switched electrical outlet thus removing power from the computer peripherals which are not needed when the PC is not in use, in the case when the Hibernation Module is unavailable, or fails to operate correctly. In a further embodiment, the Peripheral Power-Down Countdown Timer is not cancelled when a Wait Hibernate command is received from the PC, but rather the value is set to the Wait Hibernate value sent by the PC.

The energy saving device may take any desired form but preferably is a power board, a general power outlet (GPO), a wall plug or an energy centre. It is preferred that the system or method of the invention are used in connection with "plug-in" electrical devices, but the system or method may also be used with electrical devices which are permanently wired to mains electrical power. In the latter case, the energy saving device could be incorporated into the mains wiring infrastructure or incorporated as an integral part of mains powered equipment.

Although the invention has been herein shown and described in what is conceived to be the most practical and preferred embodiments, it is recognized that departures can be made within the scope of the invention, which is not to be limited to the details described herein but is to be accorded the full scope of the disclosure so as to embrace any and all equivalent devices and apparatus.

I claim:

1. An energy saving device including:
   a. an electrical inlet adapted to connect to a general power outlet,
   b. a monitored electrical outlet adapted to connect to a computing device,
   c. a switched electrical outlet adapted to connect to, and to supply electrical power to, a peripheral device,
   d. a switch adapted to control electrical connection of the inlet to the switched electrical outlet, thereby controlling supply of electric power from the inlet to any peripheral device connected to the switched electrical outlet,
   e. a sensor adapted to sense a characteristic of an electrical power flow through the monitored electrical outlet to any computing device connected to the monitored electrical outlet, the sensed characteristic providing an indication of whether the computing device is in active use;
   f. a communication module adapted to communicate a signal to the computing device when the sensed characteristic indicates that the computing device is not in active use, the signal instructing the computing device to enter a low power standby mode.

2. The device of claim 1 further adapted to remove power from the switched electrical outlet when the sensor detects that the computing device has entered a low power standby mode.

3. The device of claim 1 wherein the sensed characteristic is one or more parameters characterizing one or more of:
   a. true RMS power,
   b. voltage, and
   c. current, of the electrical power flow.

4. The device of claim 1 wherein the sensed characteristic is a measure of fluctuation in one or more of:
   a. true RMS power,
   b. voltage, and
   c. current,
   of the electrical power flow.

5. The device of claim 1 wherein:
   a. the sensed characteristic is a magnitude of one or more of:
      (1) true RMS power,
      (2) voltage, and
      (3) current,
      of the electrical power flow, and
   b. wherein the sensed characteristic indicates that the computing device is not in active use when the magnitude is below a predetermined threshold value.

6. The device of claim 1 wherein:
   a. the sensed characteristic is a magnitude of one or more of:
      (1) true RMS power,
      (2) voltage, and
      (3) current,
      of the electrical power flow, and
   b. wherein the sensed characteristic indicates that the computing device is in active use when the magnitude varies by a threshold degree from a previous value of the magnitude.

7. The device of claim 1 wherein:
   a. the sensed characteristic is a measure of the variance over time of one or more of:
      (1) true RMS power,
      (2) voltage, and
      (3) current,
      of the electrical power flow, and
   b. wherein the sensed characteristic indicates that the computing device is in active use when the measure of the variance over time varies by a threshold degree from a previous value of the measure.

8. The device of claim 1 wherein the communication module includes a wired connection between the energy saving device and the computing device.

9. The device of claim 8 wherein the wired connection is a USB connection.

10. The device of claim 1 wherein the communication module includes a wireless connection between the energy saving device and the computing device.

11. A method of using the device of claim 1, the method including the device's performance of the steps of:
    a. determining that the computing device is not in active use;
    b. obtaining from a user an indication whether the computing device is required to be active; and
    c. if the indication whether the computing device is required to be active is negative, placing the computing device into a low power standby mode.

12. The method of claim 11 further including removing electrical power from the peripheral device if the computing device is placed into a low power standby mode.

13. The method of claim 11 wherein the obtaining step includes:
   a. upon determining that the computing device is not in active use, displaying a warning that the computing device will shut down, such display being on a monitor screen of the computing device;
   b. monitoring the computing device for user input indicating that the computing device is required to be active.

14. The method of claim 11 wherein the determining step is performed by sensing at least one characteristic of an electrical power flow through the monitored electrical outlet to the computing device.

15. The method of claim 14 wherein the sensed characteristic characterizes one or more of:
   a. true RMS power,
   b. voltage, and
   c. current,
   of the electrical power flow.

16. The method of claim 14 wherein the sensed characteristic is a measure of fluctuation in one or more of:
   a. true RMS power,
   b. voltage, and
   c. current,
   of the electrical power flow.

17. The method of claim 14 wherein the sensed characteristic is a magnitude of one or more of:
   a. true RMS power,
   b. voltage, and
   c. current,
   of the electrical power flow.

18. The method of claim 14 wherein the sensed characteristic is a measure of the variance over time of one or more of:
   a. true RMS power,
   b. voltage, and
   c. current,
   of the electrical power flow.

19. A method of using the device of claim 1, the method including the device's performance of the steps of:
   a. receiving from the sensor an indication that the computing device is not in active use;
   b. obtaining from a user an indication whether the computing device is required to be active; and
   c. if the indication whether the computing device is required to be active is negative, placing the computing device into a low power standby mode.

20. The device of claim 1 in combination with a personal computer programmed to:
   a. receive the signal instructing the computing device to enter the low power standby mode;
   b. query a user for an indication whether the computing device is required to be active; and
   c. if the indication whether the computing device is required to be active is negative, place the computing device into the low power standby mode.

* * * * *